United States Patent [19]
Vachss et al.

[11] Patent Number: 5,559,640
[45] Date of Patent: Sep. 24, 1996

[54] AUTOMOTIVE REAR VIEW MIRROR SYSTEM

[75] Inventors: Frederick R. Vachss; William H. Southwell, both of Thousand Oaks, Calif.; Joseph Malus, Bloomfield Hills, Mich.; Mohsen Khoshnevisan, Newbury Park, Calif.

[73] Assignee: Rockwell International Corporation, Seal Beach, Calif.

[21] Appl. No.: 412,644

[22] Filed: Mar. 29, 1995

[51] Int. Cl.⁶ .............................. G02B 5/08; G02B 5/10; B60R 1/02
[52] U.S. Cl. .................. 359/838; 359/858; 359/859; 359/861
[58] Field of Search ................................ 359/838, 850, 359/857, 858, 859, 861, 862, 863, 871, 726, 727, 730, 731, 864, 364, 365, 366

[56] References Cited

U.S. PATENT DOCUMENTS

| | | | |
|---|---|---|---|
| 2,085,000 | 6/1937 | Borba et al. | 359/861 |
| 2,197,280 | 4/1940 | Topping | 359/861 |
| 2,570,357 | 10/1951 | Martin | 359/861 |
| 3,058,395 | 10/1962 | Mattsson | 359/861 |
| 3,165,573 | 1/1965 | Moultrie | 359/861 |
| 3,394,978 | 7/1968 | Muller | 359/861 |
| 3,809,462 | 5/1974 | Baumgarder et al. | 359/742 |
| 4,497,541 | 2/1985 | Okamura | 359/742 |
| 4,722,101 | 2/1988 | Blower | 359/859 |
| 4,828,379 | 5/1989 | Parsons et al. | 350/626 |
| 5,096,281 | 3/1992 | Windebank et al. | 359/868 |
| 5,170,284 | 12/1992 | Cook | 359/365 |
| 5,214,540 | 5/1993 | Yakimovsky | 359/858 |

FOREIGN PATENT DOCUMENTS

| | | | |
|---|---|---|---|
| 0014525 | 6/1980 | European Pat. Off. | B60R 1/10 |
| WO9206864 | 4/1992 | WIPO | B60R 1/08 |

*Primary Examiner*—Ricky D. Shafer
*Attorney, Agent, or Firm*—John C. McFarren

[57] ABSTRACT

An automotive rear view mirror system comprises passive optical elements (which may include lenses, but must include one or an odd number of mirrors) configured to provide a wide field of view with a negative optical element having a small width dimension mounted externally and close to the body of the vehicle. In a basic embodiment, a small negative optical element, such as a convex mirror, is mounted outside the vehicle, and a larger positive optical element, such as a convex lens, is placed inside the vehicle. The optical elements are positioned to be substantially confocal, with the distance between them equal to the difference in their focal lengths, so as to cancel the curvature of field generated by the external element. The internal element magnifies the image to a size comparable to that obtained with a standard external flat mirror. Alternative embodiments that are optically equivalent may incorporate a more compact "folding" of the optical path by using at least one additional mirror placed between the external and internal optical elements, thus allowing the elements to be configured more compactly and placed out of the driver's way in the passenger compartment. Because the system does not require a large side-mounted outside mirror as is commonly used on present-day vehicles, the external element may be integrated into the body line of the vehicle to improve aerodynamics, styling, and safety.

18 Claims, 2 Drawing Sheets

AUTOMOTIVE REAR VIEW MIRROR SYSTEM

TECHNICAL FIELD

The present invention relates to automotive rear view mirrors and, in particular, to a rear view mirror system having a small, optically negative, external element placed close to the body of the vehicle.

BACKGROUND OF THE INVENTION

Automotive rear view mirrors are well known, easy to use, and effective, but they have some undesirable characteristics. Mirrors mounted inside automobiles typically have a limited field of view, leaving "blind spots" along the sides of the vehicle. Mirrors mounted outside automobiles have less than desired aerodynamic and aesthetic qualities because they must be large, generally 4 to 8 inches wide, to accommodate binocular vision. In congested traffic, conventional external rear view mirrors can pose a safety hazard to other vehicles, such as bicycles and motorcycles, unless they fold upon impact (as is required in some countries). Small convex mirrors can be used externally to provide a wide field of view with direct viewing. Such mirrors are poor stand-alone rear viewing devices, however, because they create image distortion and present considerable difficulty in estimating distances.

Active systems, such as remote cameras and other electronic viewing systems, tend to have limited dynamic range of light intensities and poor binocular viewing capability. Such systems provide indirect viewing and require eye adaptation by the viewer from far to near vision. Active systems also tend to be too expensive for widespread automotive use. Thus, there is a need for a low cost automotive rear view mirror system that provides undistorted direct viewing with an acceptable field of view using a small optical element mounted externally and close to the body of the vehicle.

SUMMARY OF THE INVENTION

The present invention is an automotive rear view mirror system comprising passive optical elements (i.e., mirrors and/or lenses) configured to provide a wide field of view with an external element having a small width dimension (or diameter) mounted close to the body of the vehicle. Because the system does not require a large side-mounted outside mirror, as is commonly used on present day automotive vehicles, the external element may be integrated into the body line of the vehicle to improve aerodynamics, styling, and safety.

In a basic embodiment of the rear view mirror system, a small (typically less than about 3 inches in width dimension), short focal length, negative (i.e. demagnifying) optical element is mounted on the outside of the vehicle, and a larger, longer focal length, positive (i.e., magnifying) optical element is placed inside the vehicle. These optical elements are positioned to be confocal, or nearly so, with the distance between them equal to the difference in their focal lengths. Substantially confocal placement of the optical elements cancels the curvature of field generated, for example, by an uncorrected convex mirror. The larger positive optical element magnifies the image in the small negative optical element to a size comparable to that obtained with a standard external flat mirror.

In one embodiment of the invention, the external element comprises a small convex mirror and the larger internal element comprises a positive (magnifying) lens. In another embodiment, a small negative (demagnifying) lens may be embedded in the door post over the driver's shoulder. A larger concave mirror substantially confocal with the negative lens is then placed forward of the lens to direct a magnified, corrected image to the driver. This embodiment has the advantage of a very small area projected into the air stream, but it requires more structural modifications for incorporation into an automotive vehicle.

Alternative embodiments of the invention that are optically equivalent to the basic embodiment may incorporate a more compact "folding" of the optical path, which allows the elements to be placed farther forward and out of the driver's way in the passenger compartment. The optical path may be "folded" by using additional mirrors (to total an odd number of mirrors for the system) placed between an external convex mirror and an internal positive lens. An embodiment consisting entirely of mirrors may include, for example, a small external convex mirror, a medium internal flat or convex mirror, and a large internal concave mirror for directing a corrected image to the driver.

A principal object of the invention is to reduce the size substantially of the external element in an automotive rear view mirror system. A feature of the invention is a combination of passive optical elements (mirrors and/or lens) including one or an odd number of mirrors. Advantages so of the invention include an undistorted direct rear view, a wide field of view, and a large apparent image size from a comparatively small negative optical element mounted externally but close to the body of an automotive vehicle for improved aerodynamics, styling, and safety.

BRIEF DESCRIPTION OF THE DRAWINGS

For a more complete understanding of the present invention and for further advantages thereof, the following Detailed Description of the Preferred Embodiments makes reference to the accompanying Drawings in which the same reference numerals indicate the same or similar elements throughout the various Figures, wherein.

DETAILED DESCRIPTION OF THE PREFERRED EMBODIMENTS

The present invention comprises an automotive rear view mirror system designed to reduce the size of the outside mirror substantially. Present day automotive outside rear view mirrors are generally about 4 to 8 inches wide to accommodate binocular vision. Reducing the width of a flat mirror to less than about 3 inches makes it difficult for the driver to use the mirror because each eye sees a different field of view. Small convex mirrors can be attached to external flat mirrors to provide an expanded field of view, but they are undesirable as stand-alone mirrors because of the distorted image they provide. A small diameter, stand-alone outside mirror, however, can provide advantages to the automotive industry including reduced aerodynamic drag, improved appearance, and greater safety resulting from elimination of large, protruding flat mirrors.

The present invention comprises a system of passive optical elements (which may include lenses, but must include an odd number of mirrors) arranged to form an automotive rear view mirror system. The system includes a negative (demagnifying) outside element (i.e., external to the passenger compartment) that has a width dimension generally less than about 3 inches and a larger positive (magnifying) internal element positioned substantially confocal with the small external element to yield an undistorted rear view image having a field of view comparable to that of a conventional flat outside mirror (typically about 15° for the driver's side).

Figure 1:
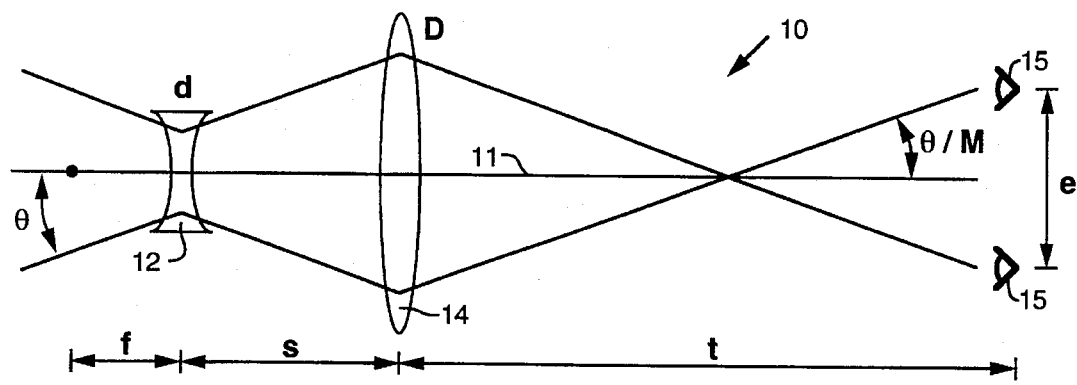
FIG. 1 is a schematic layout of a conceptual configuration of optical elements for defining the half field of view angle 0 in an automotive rear view system of the present invention.

FIG. 1 is a schematic layout of a conceptual configuration of a lens system 10 with a straight optical axis 11. Configured as an automotive rear view system, system 10 includes elements both outside (external to) and inside (internal to) the passenger compartment of the vehicle. For purposes of analysis, an external element 12 is illustrated as having a width dimension d, a focal length f, and a field of view half angle θ. Element 12, which comprises a small negative (demagnifying) optical element, is shown as a double-concave lens, but may comprise a convex mirror as described below. A positive (magnifying) internal optical element 14 has a width dimension D and a focal length of f+s. Element 14, which is shown as a double-convex lens, but which may comprise a concave mirror as described below, is located a distance s from element 12 so as to be confocal (or nearly confocal) with element 12. The automobile driver's eyes 15, separated by a distance e, are located a distance t from internal element 14.

Design preferences (provided as examples and not limitations) for the automotive rear view system of the present invention are as follows. The outside element 12 should have a width dimension d less than about 3 inches. The exit image beam should be wider than the eye separation e of the driver so that the same field is seen with both eyes. The distance t from the positive internal element 14 to the driver's head should be specified to be consistent with automobile design parameters. The separation distance s between external element 12 and internal element 14 should not be so large so as to protrude excessively into the passenger compartment. The driver should also be able to see a field of view that is comparable to (or larger than) what can be seen with a typical flat outside mirror. Furthermore, driver head motion should increase the field of view just as it does with a standard outside mirror.

The field of view for a flat outside rear view mirror can be calculated using the layout and notation of FIG. 1. Outside mirror width is d and the mirror-to-driver distance is s+t. If the driver had one eye, the field of view half angle θ would be d/[2(s+t)]. However, without being aware of it, the driver uses both eyes to increase the field of view. For a flat mirror, the driver's right eye increases the field on the other side of the optical axis, as is the case with the double lens system illustrated in FIG. 1. Thus, the largest field of view half angle is given by $$\theta = \frac{(d+e)}{2(s+t)}.$$

As an example, with d=4", e=3", and s+t=25", the result is θ=8°, thus providing a 16° full field of view. Because human eyes are generally less than 3 inches apart, this result agrees with the usual calculation that a 4-inch flat rear view mirror provides a 15° field of view.

A ray trace can be performed to compute the field of view for the layout of optical system 10 illustrated in FIG. 1. As described above, the negative and positive optical elements 12 and 14, respectively, are located in a substantially confocal configuration. In this configuration, the system 10 is afocal, with objects at infinity focused at infinity so that the driver does not have to refocus to see objects in the rear view mirror system.

The ray trace begins at negative (external) element 12, at an angle θ at −d/2. The ray propagates through the system to the driver's eye located at e/2 at an angle θ/M, where M=(f+s)/f, f is the focal length of negative element 12, and s is the separation distance between external element 12 and internal element 14. Ray vectors (y,β), where y is the ray displacement and β is the ray angle, are traced (first order) through lenses according to the matrix equation, $$\begin{bmatrix} y \\ \beta \end{bmatrix} = \begin{bmatrix} 1 & 0 \\ -1/f & 1 \end{bmatrix} \begin{bmatrix} y_0 \\ \beta_0 \end{bmatrix},$$

where f is the focal length of the lens. Rays propagate through free space according to the matrix equation, $$\begin{bmatrix} y \\ \beta \end{bmatrix} = \begin{bmatrix} 1 & z \\ 0 & 1 \end{bmatrix} \begin{bmatrix} y_0 \\ \beta_0 \end{bmatrix},$$

where z is the propagation distance along the axis.

Tracing the ray described above through optical system 10, the equation for the focal length f for a given angle of incidence θ at negative lens 12 is $$f = \frac{1}{M-1} \left[ \frac{Md+e}{2\theta} - \frac{t}{M} \right],$$

where θ is the half field of view in radians (0.14 radians equals 8°). The afocal condition, where the focal length of positive internal element 14 is F=Mf=f+s, gives the relation, $$s=(M-1)f.$$

As an example, assuming the driver's head will be 18 inches (t=18) from positive element 14, external element 12 dimension d=1 inch, M=4 (to provide a beam width for both eyes), θ=0.14 (for a 16° field of view to match that of a standard flat mirror system), and eye separation e=3 inches. Calculated from the foregoing equations, this example yields the values f=6.833 inches, F=27.333 inches, and s=20.5 inches.

If the foregoing example is modified so outside element 12 has a dimension d of 2 inches and M=2, s is calculated to be 16 inches, which is not significantly better than the 20.5 inches calculated with a 1 inch outside element 12. If an output beam size of 4 inches is required, then dM=4, and s, which is an important design parameter, can be found from the simple expression $$s = 400/\Phi - 4.5 \, d,$$

where $\Phi$ is the full field of view in degrees and d is the width dimension of external element 12 in inches.

In general, the optical system of the present invention includes a negative (demagnifying) element 12, having a small width dimension, mounted outside and close to the body of the vehicle, and at least one larger positive (magnifying) element 14, mounted inside the vehicle and substantially confocal with the external element, for correcting, magnifying, and directing the image to the driver. The internal element(s) provide a flat (or nearly flat), undistorted optical image with magnification to such a width that the driver can see the image with both eyes at the same time. The same magnification is seen with each eye so that there is no confusion caused by lateral diversity. The optical elements comprising concave and convex mirrors and lenses can be made aspheric to provide optimum magnification with minimal distortion at large angles of incidence.

It should be apparent that the straight line optical system 10 of FIG. 1, which illustrates the theory of the invention, must be modified for installation in an automotive vehicle as a rear view mirror system. In actual practice, external element 12, illustrated as a double-concave (negative) lens in FIG. 1, generally comprises a convex mirror operating off-axis. Internal element 14, illustrated as a double-convex (positive) lens in FIG. 1, may comprise a concave mirror or a combination of lenses and mirrors. External element 12 may be mounted on the door, fender, or other body part of the vehicle. Internal element 14 may be mounted in the door or the instrument panel of the passenger compartment so that it is substantially confocal with element 12. Additional mirrors (such that the total number of mirrors in system 10 is odd (i.e., 1, 3, 5, etc.)) may be positioned between optical elements 12 and 14 to "fold" the optical path. This facilitates the packaging and placement of system 10 so that it does not protrude into the passenger compartment of the automobile. In preferred embodiments, at least one of the optical elements of system 10 is adjustable (such as in position and/or angle, for example), either directly or remotely, for optimum viewing by different operators. Alternative embodiments of the automotive rear view mirror system of the present invention are presented in FIGS. 2–6 to illustrate various configurations of the passive optical elements of system 10.

FIGS. 2–5 illustrate exemplary embodiments of the rear view mirror system of the present invention installed on the left side (U.S. driver's side) of a vehicle. FIG. 6 illustrates an exemplary embodiment with systems installed on both the left and right sides of the vehicle. Transparent windows or panels 20 and 2 1, which represent, respectively, the left and right sides of the automotive vehicle, allow a rear view image to be directed from the outside of the vehicle to the inside toward the driver's eyes 15.

Figure 2:
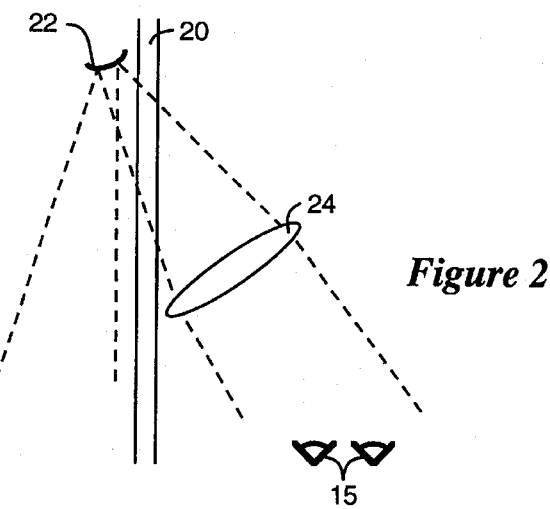
FIG. 2 is a schematic top view of an embodiment of the optical system of FIG. 1 using a convex mirror as an external negative element and a convex lens as an internal positive element in an automotive rear view mirror system.

In FIG. 2, a small size convex mirror 22 (which corresponds to optical element 12 of FIG. 1 and typically has a width dimension of less than about 3 inches, for example) is mounted external to side panel 20 but close to the body of the automotive vehicle. Mirror 22 is mounted to provide an acceptably wide field of view toward the rear of the vehicle. As indicated by the dotted lines, a rear view image is reflected by external mirror 22 through transparent panel 20 to a convex lens 24 (which corresponds to optical element 14 of FIG. 1) located inside the passenger compartment of the automotive vehicle and substantially confocal with mirror 22. Lens 24 is shaped to correct distortions produced by convex mirror 22 and to magnify the image directed toward the driver's eyes 15.

Figure 3:
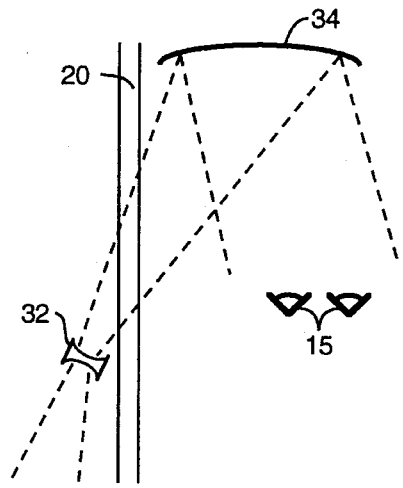
FIG. 3 is a schematic top view of an embodiment of the optical system of FIG. 1 using a concave lens as an external negative element and a concave mirror as an internal positive element in an automotive rear view mirror system.

FIG. 3 illustrates an embodiment of the present invention comprising an external concave lens 32 and an internal concave mirror 34 placed substantially confocal with lens 32. Concave lens 32 may be embedded in a door post at a level above the driver's shoulder, as an example, to project a rear view image toward concave mirror 34 located in the passenger compartment forward of lens 32 and the driver's eyes 15. Concave mirror 34 may be shaped to correct spherical distortions produced by concave lens 32 and to magnify and direct the image toward the driver's eyes 15. The external elements of this embodiment may have minimal projection into the air stream around the vehicle but, compared to other embodiments, installation of this system may require more substantial modifications of the automotive vehicle.

Figure 4:
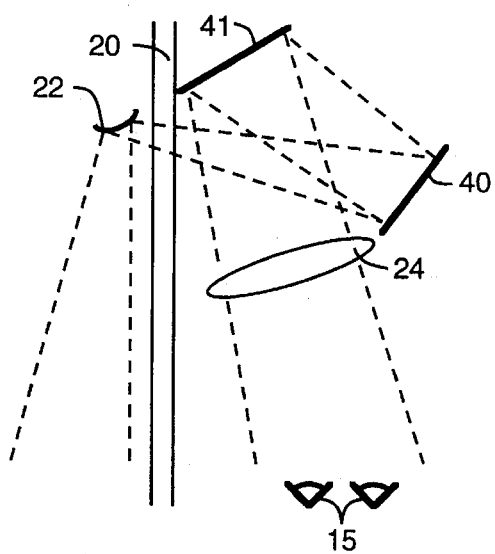
FIG. 4 is a schematic top view of an embodiment of the automotive rear view mirror system of the present invention using a convex external mirror and two flat "folding" mirrors to reduce the separation distance of the large internal positive lens.
Figure 5:
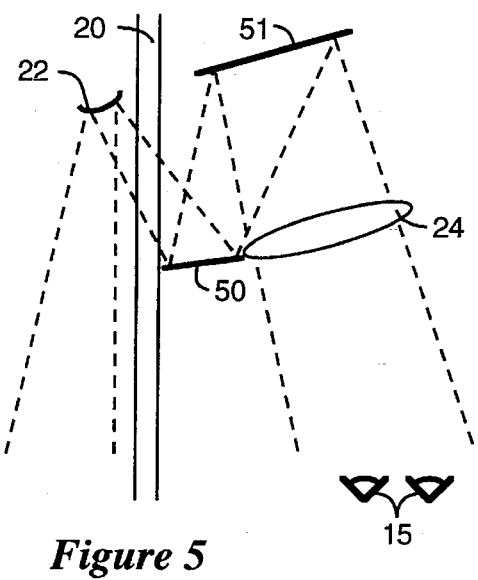
FIG. 5 is a schematic top view of an alternative arrangement of the optical elements of the embodiment illustrated in FIG. 4.
Figure 6:
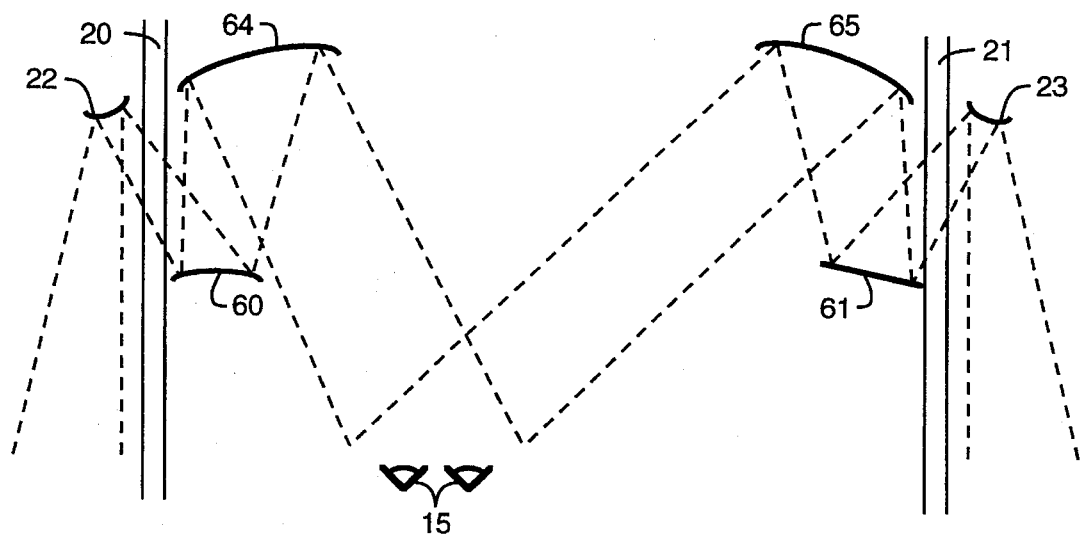
FIG. 6 is a schematic top view of an embodiment of the automotive rear view mirror system of the present invention illustrating, for the left side of the vehicle, a small external convex mirror, an internal convex folding mirror, and an internal concave mirror; and, for the right side of the vehicle, a small external convex mirror, an internal flat folding mirror, and an internal concave mirror.

FIGS. 4 and 5 illustrate embodiments similar to that of FIG. 2 but with the addition of mirrors 40, 41 and 50, 51, respectively in FIGS. 4 and 5, to "fold" the optical path between external mirror 22 and internal lens 24. These embodiments are optically equivalent to the basic layout of system 10, but the "folding" of the optical path allows the mirror system to be constructed more compactly and placed farther forward and out of the driver's way (such as in the vehicle's instrument panel, for example). Using an odd number of mirrors retains the image is with the same left to right configuration as produced by a single (standard) outside mirror. Various such "folded" arrangements are within the scope of the invention and allow the internal elements of the optical rear view mirror system to be installed on either or both sides of the vehicle and in a convenient place, such as in a door panel or the instrument panel, for example.

FIG. 6 illustrates embodiments of the present invention installed on both sides of a vehicle and comprising mirrors only. Rear view images from external convex mirrors 22 and 23 (mounted on the left and right sides of the vehicle, respectively) are directed to internal mirrors 60 and 61, respectively. Mirror 60 is illustrated as a convex mirror and mirror 61 is illustrated as a flat mirror, as examples, but other shapes may be used as needed to correct distortions and direct the image toward larger concave mirrors 64 and 65, respectively. Concave mirrors 64 and 65 are placed substantially confocal with mirrors 22 and 23, respectively. Concave mirrors 64 and 65 are also shaped to correct for any distortions produced by mirrors 22, 60 and 23, 61, respectively, and to magnify and direct the left and right rear view images toward the driver's eyes 15.

The automotive rear view mirror system of the present invention provides added safety and a large reduction in aerodynamic drag resulting from the decreased area of the outside optical element mounted on the vehicle. The reduced size of the outside optical element also allows more aesthetically pleasing vehicle designs without sacrificing rear view mirror functionality.

Furthermore, the invention allows use of mirrors and/or lenses with cylinder optical power (curved in one direction only) to correct off-axis aberration introduced by a large angle of incidence on the outside element. Although this requires an aspheric optical element, it permits use of a symmetric lens, particularly on the right (passenger) side of the car.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A rear view system for an automotive vehicle, comprising;

a plurality of passive optical elements including at least one mirror, where the number of mirrors is odd;

a first of said passive optical elements comprising a negative optical element having a maximum width dimension of 3 inches mounted on the exterior close to the body of the vehicle;

a second of said passive optical elements comprising a positive optical element mounted inside the vehicle and positioned substantially confocal with said first optical element;

said first optical element directing a rear view image to said second optical element; and said second optical element directing said rear view image to a vehicle operator with objects at infinity focused at infinity in a substantially flat, undistorted optical image viewable by both eyes of the operator simultaneously.

2. The rear view system of claim 1, wherein said negative optical element comprises a convex mirror and said positive optical element comprises a convex lens.

3. The rear view system of claim 1, wherein said negative optical element comprises a concave lens and said positive optical element comprises a concave mirror.

4. The rear view system of claim 1, wherein said plurality of passive optical elements further includes at least one folding mirror placed between said first and second optical elements for redirecting said image from said first optical element to said second optical element.

5. The rear view system of claim 4, wherein said negative optical element comprises a convex mirror and said positive optical element comprises a concave mirror.

6. The rear view system of claim 4, wherein said negative optical element comprises a convex mirror and said positive optical element comprises a convex lens.

7. A rear view system for an automotive vehicle, comprising;

a plurality of passive optical elements including an odd number of mirrors, where odd includes one;

a first of said passive optical elements comprising a convex mirror having a maximum width dimension of 3 inches mounted on the exterior close to the body of the vehicle;

a second of said passive optical elements comprising a positive optical element mounted inside the vehicle and substantially confocal with said negative optical element;

said convex mirror directing a vehicle rear view image to said positive optical element; and said positive optical element directing said rear view image to a vehicle operator with objects at infinity focused at infinity in a substantially flat, undistorted optical image viewable by both eyes of the operator simultaneously.

8. The rear view system of claim 7, wherein said positive optical element comprises a convex lens.

9. The rear view system of claim 7, wherein said positive optical element comprises a concave mirror.

10. The rear view system of claim 7, wherein said plurality of passive optical elements further includes at least one folding mirror placed between said first and second optical elements for redirecting said image from said first optical element to said second optical element.

11. The rear view system of claim 10, wherein said positive optical element comprises a concave mirror.

12. The rear view system of claim 10, wherein said positive optical element comprises a convex lens.

13. A rear view system for an automotive vehicle, comprising;

a plurality of passive optical elements including an odd number of mirrors, where odd includes one;

a first of said passive optical elements comprising a negative optical element having a width dimension less than about 3 inches mounted on the exterior close to the body of the vehicle;

a second of said passive optical elements comprising a positive optical element mounted inside the vehicle and substantially confocal with said negative optical element;

said negative optical element directing a rear view image to said positive optical element; and said positive optical element directing said rear view image to a vehicle operator, said rear view image having a field of view of at least 15° with objects at infinity focused at infinity in a substantially flat, undistorted optical image viewable by both eyes of the operator simultaneously.

14. The rear view system of claim 13, wherein said negative optical element comprises a convex mirror.

15. The rear view system of claim 13, wherein said negative optical element comprises a convex mirror and said positive optical element comprises a convex lens.

16. The rear view system of claim 13, wherein said negative optical element comprises a concave lens and said positive optical element comprises a concave mirror.

17. The rear view system of claim 13, wherein said plurality of passive optical elements further includes at least one folding mirror placed between said negative and positive optical elements for redirecting said image from said negative optical element to said positive optical element.

18. The rear view system of claim 17, wherein said negative optical element comprises a convex mirror and said positive optical element comprises a concave mirror.

* * * * *